Figure 1:
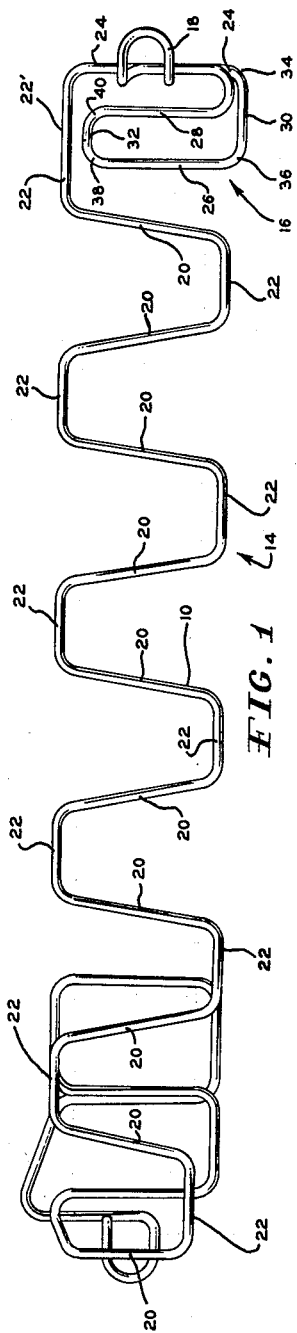

Sept. 1, 1964

M. STUBNITZ 3,146,999

SPRING ELEMENT

Filed Dec. 7, 1962

2 Sheets-Sheet 1

BY Beaman & Beaman

ATTORNEY

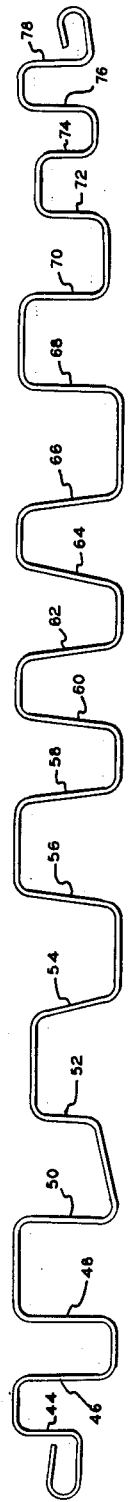
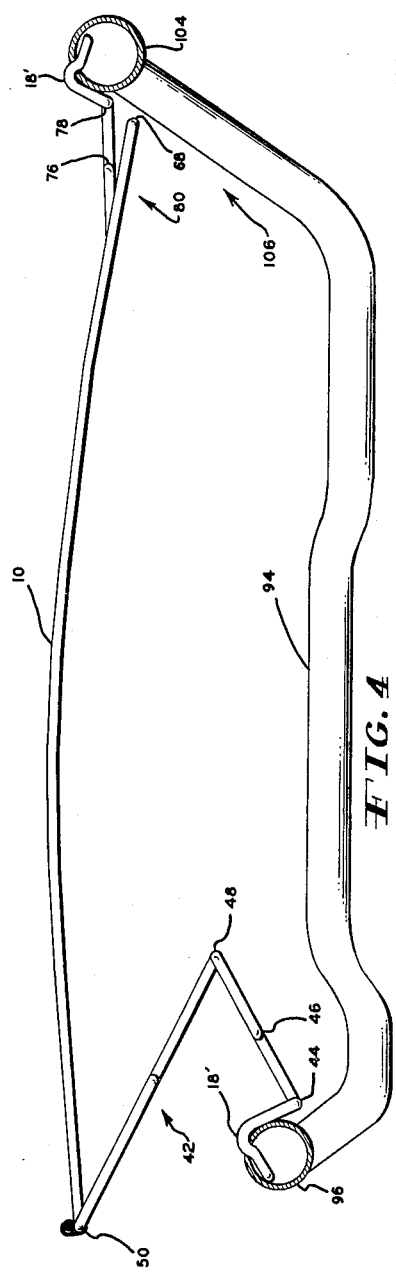
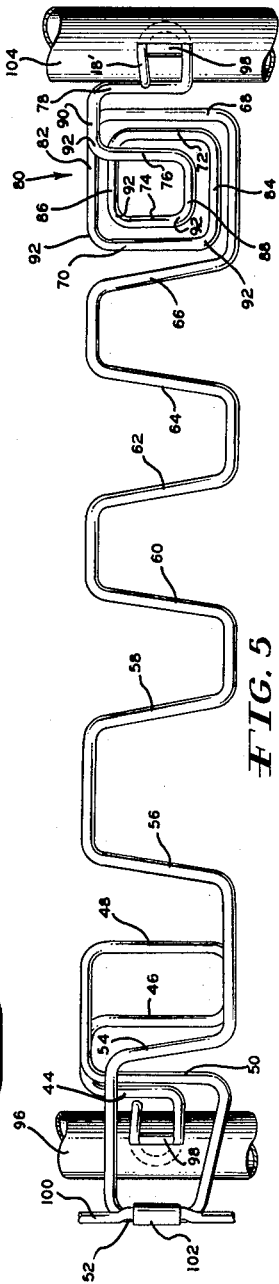

United States Patent Office
3,146,999
Patented Sept. 1, 1964

3,146,999
SPRING ELEMENT
Maurice Stubnitz, Manitau Beach, Mich., assignor to Stubnitz Greene Corporation, Adrian, Mich., a corporation of Michigan
Filed Dec. 7, 1962, Ser. No. 242,952
2 Claims. (Cl. 267—1)

The present invention relates to improvements in linear spring elements of the type used in vehicles and functions to span spaced frame elements to provide a resilient supporting surface.

More specifically, the present invention is particularly concerned with linear spring elements used in the front seats of vehicles which are so designed as to provide maximum toe room for the back seat occupants, yet provide adequate resilient support and avoid overstressing of the spring element in service.

At the present time, manufacturers of wire springs are well equipped to make sinuous type, linear springs, known in the trade as "zig-zag" and "formed wire" springs. The manufacture of such springs involves the formation of alternate series of spacer and torsion bar portions. Shaping of the spring elements is accomplished by contouring the spacer bar portions or twisting the torsion bar portions, or by a combination thereof. The present invention is capable of being performed upon existing equipment.

Thus, an object of the invention is to provide an improved linear spring element which requires a minimum amount of clearance for installation and operation, whereby it is well adapted for conserving toe room in vehicles.

Another object is to provide an improved linear type spring element which may be economically manufactured upon existing equipment.

A further object of the invention is to provide an improved linear type spring in which one or more enlarged loops are provided for supplying the required wire to give adequate springing and avoid overstressing.

A still further object resides in providing a spring element having improved trimming characteristics.

These and other objects and advantages residing in the present invention will more fully appear from the following specification and the appended claims.

Figure 2:
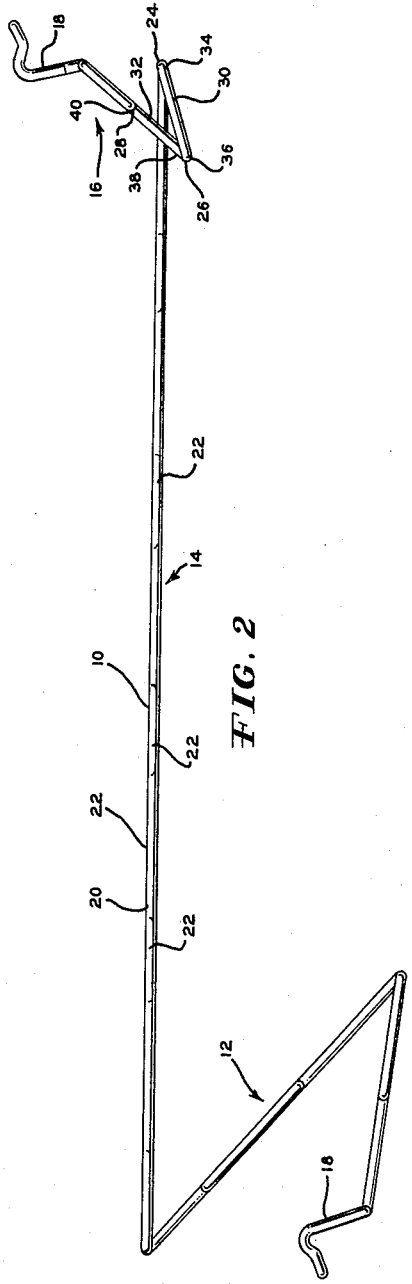

In the drawings,

FIG. 1 is a plan view of a completed spring element having a single enlarged loop, FIG. 2 is a side elevational view of FIG. 1, FIG. 3 is a plan view of a spring element development prior to twisting the torsion bar portions to complete the spring form, FIG. 4 is a side elevational view of the spring element of FIG. 3 completely formed and installed in a seat frame, and FIG. 5 is a plan view of FIG. 4.

Referring to the drawings, a formed wire spring element 10 is shown having a fishmouth supporting portion 12 at one end, a sinuous span 14, and a support portion at the opposite end, generally designated by reference character 16, and embodying one form of the present invention. The support portions 12 and 16 terminate in suitable frame anchorages 18 which may correspond in form and function to the disclosure of copending application Serial No. 185,967, filed April 9, 1962. The fishmouth portion 12 and the span 14 may be of any well known form, either of "formed" or "zig zag" wire. Moreover, the span 14 may be partly sinuous and partly of "straight" wire lengths or entirely of a "straight" wire length, similar to that shown in U.S. Patent No. 2,910,115.

As used in the front seat of a vehicle, the supporting portion 12 will be at the front of the seat and the supporting portion 16 will be at the rear of the seat. The toe room clearance of the occupants of the rear vehicle seat will be located below the portion 16, as viewed in FIG. 2.

The span 14, which is constructed according to the known art, comprises torsion bar portions 20 connected by alternately disposed spacer bar portions 22. As an integral extension of the span 14, the present invention comprises what has been designated as a "square loop" consisting of a sequence of torsion bars 24, 26 and 28 and spacer bars 30 and 32 connected by substantially right angle bends 34, 36, 38 and 40, the angular relationship between the spacer bar portion 22 (designated by reference character 22') of the supporting portion 16 and the spacer bar 30 and between the spacer bar 30 and the spacer bar 32 being accomplished by twisting the torsion bars 24 and 26 about their axes, as will be more fully described in the following discussion of the form of the invention shown in FIGS. 3 through 5.

In lieu of the five-sided single "square loop" defined by the torsion and spacer bars 24, 30, 26, 32 and 28 of FIGS. 1 and 2, two or more "square loops" may be embodied in the rear supporting portion of the spring element located above the toe space, as shown in FIGS. 3 through 5.

FIG. 3 shows a continuous piece of spring wire which has been fully formed in regard to the portions thereof which define the torsion and spacer bar portions of the completely formed spring element shown in FIGS. 4 and 5. To complete the form of the spring element, only the step of twisting certain of the torsion bar portions about their longitudinal axes is required.

To be more specific, the fishmouth supporting portion 42 is formed by twisting the torsion bar portions 44, 48 and 50 about their longitudinal axes to the extent necessary to provide the desired form, it being necessary to overtwist the same in order to take care of "spring back."

At the rear end of the spring element 10', the supporting portion, generally designated by reference character 80, in the shape of a double "square loop" has been formed from the development shown in FIG. 3 by twisting the torsion bar portions 68, 70, 72, 74 and 78. It will be noted that the torsion bar portions 68, 70 and 72 are shown substantially disposed in the same plane as the torsion bar portions 74, 76 and 78. The torsion bar portions making up the support portion 80 are connected to spacer bar portions 82, 84, 86, 88 and 90 through substantially right angle bends 92.

It will be observed from FIG. 5 that the length of the spacer bar portion 86 is less than that of the portion 84 and that the portion 88 is of less length than the portion 86. Likewise, the length of the torsion bar portion 70 is less than the portion 68, the portion 72 is of lesser length than the portion 70, and the portion 74 is of lesser length than the portion 72. This arrangement enables the portions 72, 86, 74 to be disposed in substantially the same plane as the portions 68, 82, 70 and 84. It will also be noted from FIG. 4 that such a plane preferably substantially coincides with the surface in which the spring element 10' is disposed, thus giving a maximum amount of clearing in the toe area at the rear of the seat frame.

Those skilled in the art will readily appreciate that the amount of spring wire embodied in the single and double "square loops" of FIGS. 1 and 5 will supply the necessary resiliency without the depth of resilient support that has heretofore been provided by conventional coil springs, fishmouth structure, such as 12 and 42, and the like.

It is to be understood that the tubular seat frame 94 is representative of the adjustable frame structure used in passenger vehicles and it is supported for movement upon a track structure mounted upon the floor. The section 96 of the frame 94 is located at the front of the seat and it is perforated at 98 to receive the anchorage 18' of the fishmouth supporting portion 42. A front border wire is shown at 100 to which the torsion bar portion 50 of adjacent spring elements 10' are attached by clips 102.

At the rear of the front seat, the rear section 104 of the frame 94 is shown located substantially above the front section 96 to provide toe room in the area 106 for the occupants of the rear seat of the vehicle. The section 104 is likewise slotted at 98 along its length to receive the anchorage 18'.

I claim:

1. A spring element for a seat frame comprising a linear span having front and rear span supporting portions, said rear portion comprising a flat coil defined by a sequence of lateral and transverse torsion and spacer bar portions connected by similarly directed, substantially right angle bends, said bar portions being of different length and disposed in substantially the same plane.

2. A spring element as defined in claim 1, wherein said flat coil is substantially disposed in an extension of the surface in which said span is located.

References Cited in the file of this patent
UNITED STATES PATENTS

| | | |
|---|---|---|
| 2,886,311 | Flint | May 12, 1959 |
| 3,024,016 | Strout et al. | Mar. 6, 1962 |
| 3,087,719 | Flint | Apr. 30, 1963 |